May 17, 1938. M. HAJOWAY 2,117,418
PLAITED RUBBER ARTICLE AND METHOD OF MAKING THE SAME
Filed Jan. 7, 1937
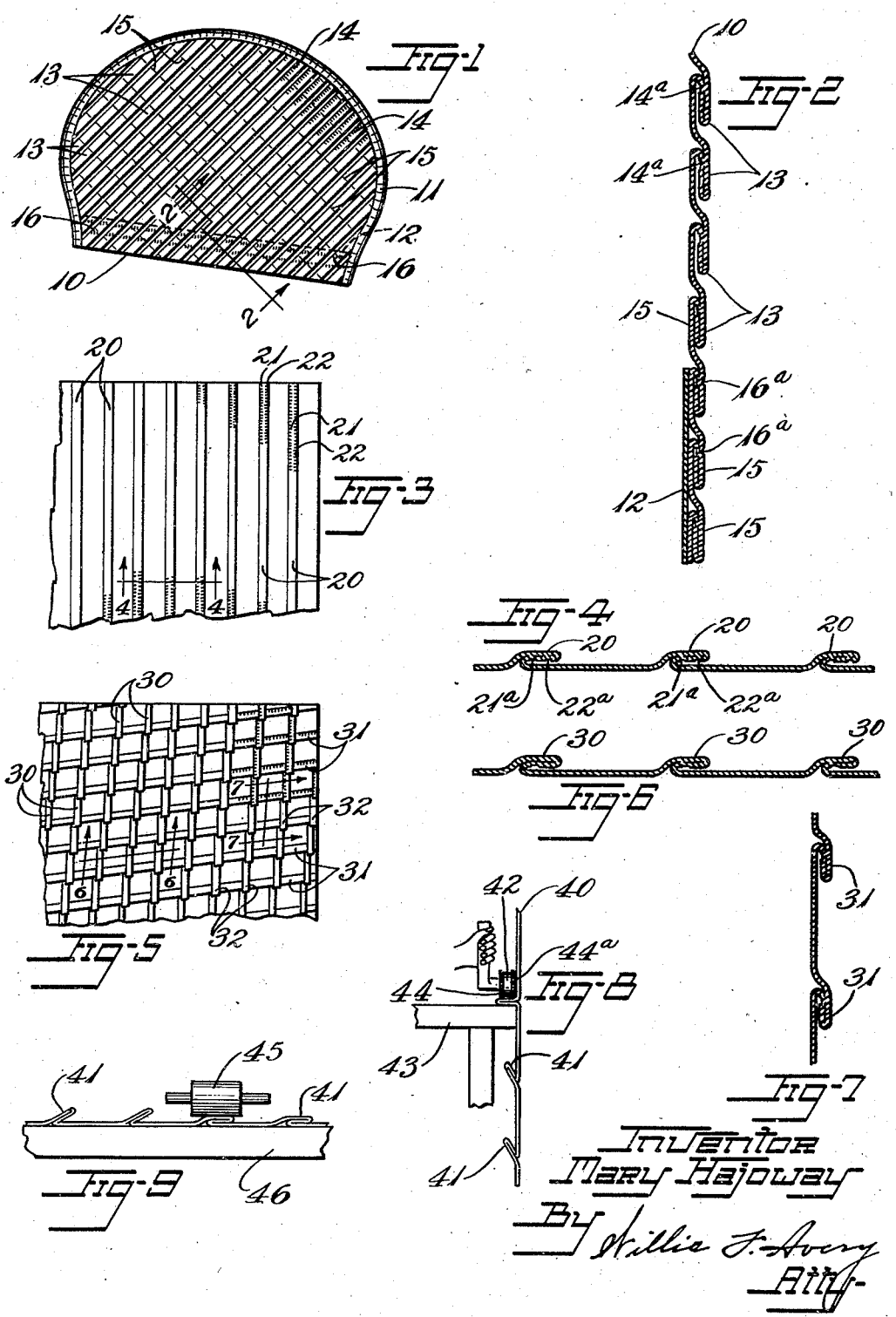

Patented May 17, 1938

2,117,418

UNITED STATES PATENT OFFICE 2,117,418

PLAITED RUBBER ARTICLE AND METHOD OF MAKING THE SAME

Mary Hajoway, Akron, Ohio, assignor to The B. F. Goodrich Company, New York, N. Y., a corporation of New York Application January 7, 1937, Serial No. 119,420

14 Claims. (Cl. 154—33)

This invention relates to sheet rubber articles such, for example, as bathing caps, bathing suits and aprons, and to methods of making the same.

The chief objects of the invention are to provide an improved rubber article having plaits or surface folds, to provide permanence of the plaited form, to provide attractiveness of appearance, to provide a high degree of extensibility of the article, and to provide convenient procedure for making the article.

These and further objects will be apparent from the following description, reference being had to the accompanying drawing, in which:

Fig. 1 is an elevation of a bathing cap constructed according to and embodying the invention.

Fig. 2 is a section taken along the line 2—2 of Fig. 1, the section being taken through one side only of the cap.

Fig. 3 is a plan view of sheet rubber embodying a modified form of the invention, the sheet rubber being shown before it is made into a cap or other article, and parts being broken away.

Fig. 4 is a section taken along the line 4—4 of Fig. 3.

Fig. 5 is a view like Fig. 3, but showing a further modified form of the invention.

Fig. 6 is a section taken along the line 6—6 of Fig. 5.

Fig. 7 is a section taken along the line 7—7 of Fig. 5.

Fig. 8 is a view in elevation illustrating a step in the procedure of making the plaited sheet rubber according to the invention.

Fig. 9 is a view in elevation illustrating a subsequent step in the procedure.

For the purpose of illustration, the invention is shown in Figs. 1 and 2 as applied to a rubber bathing cap. The cap comprises a body 10 of sheet rubber, comprising two side portions which may be joined together by a rubber binding strip 11 adhered to the body portions. If desired, a reinforcing band 12 may be adhered to the inner face of the open margin of the cap. The body 10 is formed of sheet rubber folded upon itself in a plurality of folds 13, 13 which are formed in the rubber before it has been completely vulcanized so that after vulcanization the sheet rubber maintains its folded or plaited form by virtue of the resilience of the rubber. For additionally holding the rubber in the plaited form and for adding to the ornamental effect of the surface adjacent plies of the plaits preferably are adhesively stitched or welded together as by pressure from a knurled roller while the rubber is still unvulcanized to provide rows 14, 14 of small adhered areas 14a, 14a (Fig. 2). By applying the knurled roller to a face of the plait that is concealed in the plaited structure, the indentations will be concealed and slight corrugations may be made to appear at the upper exposed face of the plait adding to its appearance. Preferably only the two outer plies of each fold are thus adhered together, the intermediate ply and the body ply beneath it being unadhered, except that, if desired, all three plies may be stitched together by adherence of the rubber along lines 15, 15 extending transversely across the plaits to adhere together all the plies of the plaits along these lines and to give a somewhat checkered appearance to the surface. In Fig. 2 the section is so taken as to show the four lowermost plaits adhered to all three plies and the three uppermost plies adhered only as to the two outer plies.

The strength of the cap at the band 12 may be increased and the appearance added to by adhesively stitching together all the plies and the band 12 at spaced apart areas 16a, 16a along lines 16, 16.

Referring to the embodiment of Figs. 3 and 4, the material of the cap body may be formed with parallel plaits 20, 20 spaced considerably farther apart than in the construction of Fig. 1. Here too, only the outer two plies of each plait need be adhered together, although, if desired, in order to prevent the plaits from standing up under distension of the material, all three plies of each plait may be adhered together. It is preferred, however, to adhere together only the two outer plies as this permits a greater extensibility of the sheet under severe stretching forces. In this embodiment the plaits are illustrated as adhered along two rows 21, 22 of adhered areas 21a, 21a and 22a, on each plait.

In the embodiment of Figs. 5 to 7, the sheet material is formed with a series of parallel plaits 30, 30 extending in one direction of the sheet and a plurality of plaits 31, 31, extending transversely of the first series of plaits. The second series of plaits may be disposed at right angles to each other or at other angles, as desired. At the junctures 32, 32 of the two series of plaits the material will be of nine-ply thickness, but as the material may be quite thin and as it is plaited in an uncured or only partially cured state, these junctures may be well flattened, and the appearance of the material is attractive. In this embodiment, as in those previously described, only certain of the superimposed plies of the plaits may be adhered together or, if desired, all may be adhered together.

The sheet rubber is plaited according to the invention preferably while the rubber is unvulcanized or only semi-vulcanized so that it may be permanently plaited and so that it may be adhered together by welding of the rubber. Referring to Fig. 8 the sheet rubber, indicated at 40, is folded to provide successive plaits 41, 41 and these may be adhered together as by pressing a suitable knurled roller 42 upon the fold of the sheet rubber against a suitable support 43. The roller 42, in the illustrated form, has two sets of teeth 44 and 44a to effect on each plait the double row of adhered areas shown in Figs. 3 and 4. The adhered folds preferably are then pressed as shown in Fig. 9, as by means of a roller 45, against a suitable support 46 to flatten the folds against the plait. If desired, the operations of adhering the plies of the folds and flattening the folds may be performed with the sheet rubber folded directly to the flattened form of Fig. 9, in which event the indentations at the areas of adhesion will appear at the outer faces of the plaits, rather than being concealed as in the illustrated embodiments. The two sets of plaits of the embodiment of Fig. 5 may be formed by repeating the procedure as to the transverse plaits.

After the material has been thus plaited it is formed into a cap or other article and then vulcanized, whereupon the material retains its plaited form by virtue of the resilience of the rubber.

Variations may be made without departing from the scope of the invention as it is defined in the following claims.

I claim:

1. A rubber article comprising sheet rubber having a series of flattened plaits extending generally in one direction of the sheet and a second series of flattened plaits extending transversely thereto and across the plaits of the first said series.

2. A rubber article comprising sheet rubber having a series of parallel flattened plaits extending generally in one direction of the sheet and a second series of flattened plaits extending transversely thereto, adjacent surfaces of said plaits being adhered to one another.

3. A rubber article comprising sheet rubber having a series of parallel flattened plaits extending generally in one direction of the sheet and a second series of flattened plaits extending transversely thereto, adjacent surfaces of said plaits being adhered to one another at spaced apart areas along the plaits.

4. The method of making a sheet rubber article which comprises providing a plurality of folds in a sheet, adhering together adjacent surfaces of the folds at spaced apart areas thereof, and flattening the folds against the sheet.

5. The method of making a sheet rubber article which comprises providing a series of plaits in a sheet, adhering together adjacent surfaces of the plaits and flattening the plaits against the sheet without adhering the plaits thereto to provide a plaited rubber article.

6. The method of making an article of apparel comprising a sheet rubber which comprises providing a plurality of plaits in the sheet rubber before it has been completely vulcanized, flattening the plaits against the sheet, and then vulcanizing the rubber so that it will retain its flat plaited form by virtue of the resilience of the rubber.

7. The method of making a sheet rubber article which comprises providing a plurality of folds extending generally in one direction of the sheet, providing a plurality of folds extending transversely thereto and over the first said folds, flattening the folds and adhering together adjacent surfaces thereof.

8. An article of apparel comprising a body portion of sheet rubber folded upon itself to provide spaced-apart bands of the doubled rubber adhered along adjacent walls and extending throughout an extensive area of said portion, said bands being flattened against the sheet but unadhered thereto and maintaining such folded shape by the resilience of the folded rubber.

9. An article of apparel comprising a body portion of sheet rubber folded upon itself to provide spaced-apart bands of the doubled rubber flattened against the sheet and extending throughout an extensive area of said body portion, the rubber being vulcanized in the flattened folded shape to maintain such shape by the resilience of the rubber, and portions of adjacent wall areas of the folds being adhered together.

10. An article of apparel as defined in claim 9 in which the adjacent wall areas are adhered together only at intervals along the folds.

11. An article of apparel comprising a body portion of sheet rubber folded upon itself to provide spaced parallel bands of doubled material adhered at intervals along adjacent walls, said bands being folded against the sheet but unadhered thereto.

12. An article of apparel comprising a body portion of sheet rubber folded upon itself to provide crossed, spaced-apart bands of the doubled rubber adhered along adjacent walls, said bands being flattened against the sheet but unadhered thereto.

13. An article of apparel comprising a body portion of sheet rubber folded upon itself to provide crossed spaced-apart bands of the doubled rubber adhered at intervals along meeting walls, said bands being flattened against the sheet but unadhered thereto.

14. An article of apparel comprising a body portion of sheet rubber folded upon itself to provide crossed, spaced-apart bands of the doubled rubber adhered at intervals along meeting walls, said bands being arranged in crossed parallel sets, the bands in each set being flattened against the sheet in one direction but unadhered thereto.

MARY HAJOWAY.